D. FASOLD.
ANTISKIDDING TIRE ARMOR.
APPLICATION FILED OCT. 6, 1910.
1,050,727.
Patented Jan. 14, 1913.
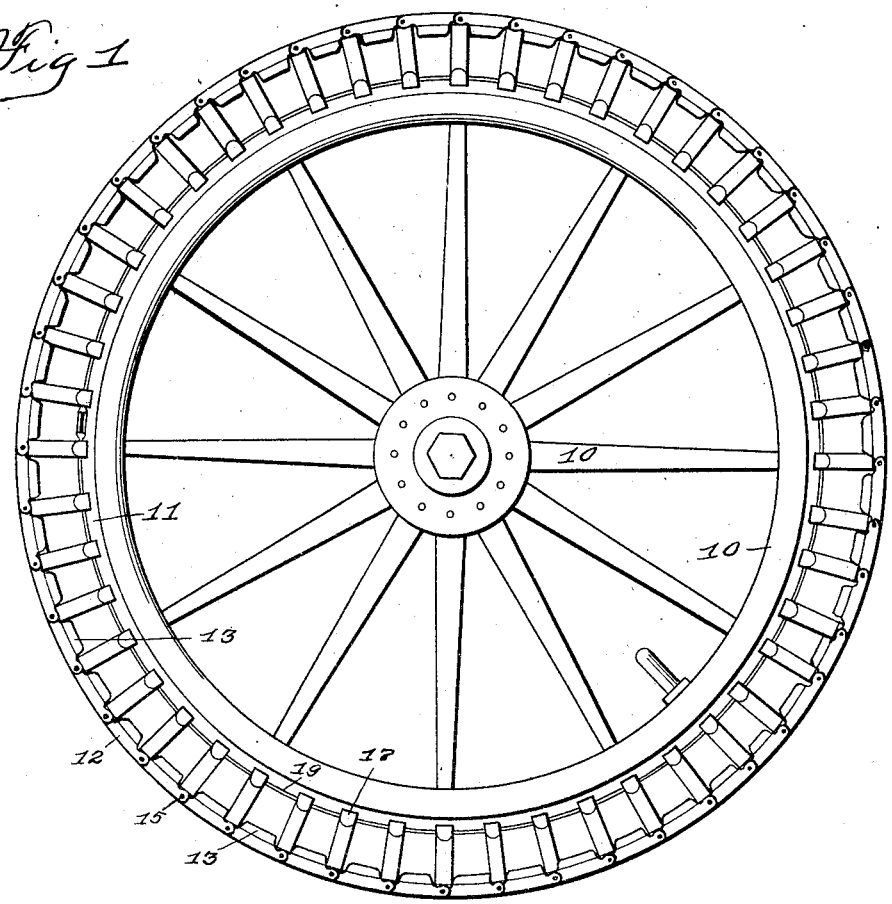
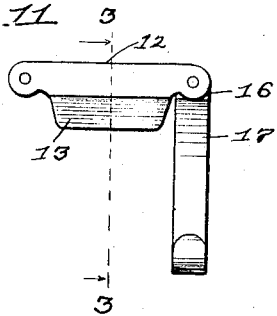
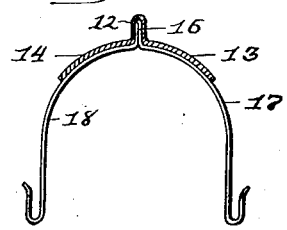
Witnesses:
Erle W. Miller
Frank Steiner
Inventor
Daniel Fasold
By Jell G. Row. Atty

UNITED STATES PATENT OFFICE.

DANIEL FASOLD, OF KESWICK, IOWA.

ANTISKIDDING TIRE-ARMOR.

1,050,727.

Specification of Letters Patent.

Patented Jan. 14, 1913.

Application filed October 6, 1910. Serial No. 585,694.

*To all whom it may concern:*

Be it known that I, DANIEL FASOLD, citizen of the United States, residing in Keswick, county of Keokuk, and State of Iowa, have invented a new and useful Improvement in Antiskidding Tire-Armor, of which the following is a specification.

The object of my invention is to provide a means, simple, strong, durable and inexpensive, in construction for preventing skidding and sliding of the front wheels of an automobile when the same is traveling over a wet and muddy road.

A further object is to construct a device for this purpose which may be easily and quickly attached to, or detached from, the wheel and which will not tear or injure the casings.

My invention consists of certain details of construction hereinafter set forth, pointed out in my claims, and illustrated in the accompanying drawings in which—

Figure I shows a side elevation view of an automobile wheel fitted out with my device; Fig. II shows a side elevation view of one of the sections I employ to make up the chain which constitutes my device; and Fig. III shows a transverse sectional view of one of my sections, taken on the line 3—3, in Fig. II.

My device consists of a series of specially constructed metal sections, designed to extend around the casing and to constitute what might be termed a flexible metal shield therefor; and also a plurality of saddle shaped members with depending hooked arms, one of said members being secured between adjacent sections.

Referring to the accompanying drawings the reference numeral 10 is used to indicate a wheel of an automobile and the numeral 11 the casing mounted thereon. My specially constructed metal sections are stamped, or cut, from one piece of metal so bent as to provide a hollow central longitudinal raised portion 12 that is U-shaped in cross-section, and two depending curved flanges, 13 and 14 respectively, extending downwardly, one from each longitudinal side thereof, the said two flanges, in combination with each other providing a concaved under surface designed to fit over the outer surface of the casing and constitute a receptacle therefor. Obviously each section is provided with an orifice at each end by means of which it is riveted, as shown at 15, to its adjacent sections, all the sections so joined forming a flexible metal shield, or chain, adapted to be fitted around the casing, the raised portions being centrally located thereon. The saddle shaped members I employ are also constructed of one piece of metal so bent as to provide a raised central portion 16 that projects into the hollow portion 12 and with two downwardly curving outwardly hooked arms, 17 and 18 respectively, one on each side of said raised portion, said arms being of sufficient length to extend practically over the casing when the shield is secured thereon. The raised portion on this said member is provided with an orifice designed to receive a rivet which will secure it in the chain, one rivet securing adjacent section and one of said members. As all of these members are similar it is obvious that a plurality of uniform arms, evenly spaced, will be provided around each side of the casing when the shield is secured thereon. The end sections in the shield are designed to be secured together by any of the ordinary means.

The numeral 19 indicates a wire or chain which is designed to pass over all the arms on one side of the chain, the hooks holding it in position, said wire or chain having its ends secured together so that it may be drawn tight as shown in Fig. I. Each side of the shield is provided with such a wire, or chain, and by this means my shield is held in permanent position relative to the casing.

When my shield is secured to the casing the plurality of sections, formed and joined as described, provide one continuous raised portion which extends outwardly from the central line of the casing, and this raised portion is designed to cut into the mud and provide the means whereby the wheels of an automobile are prevented from sliding and skidding.

I realize that my device is not practical for use on the drive, or rear wheels of a car and only claim it as beneficial when used on the front wheels.

The construction of the parts of my device may be altered somewhat without affecting my invention, the principal feature of which is to provide the aforesaid continuous raised portion to sink in the mud and an adequate means to secure my device in permanent relation to the casing.

Having thus described my invention what I claim and desire to secure by Letters Patent of the United States, is:

1. Tire armor including a series of metal sections, each section having its central portion bent in the form of an inverted U to form an anti-skidding part, a saddle shaped member at each end of each section, the saddle members having their central portions bent in the form of an inverted U which U portions conformably engage in the inverted U portions of the sections, means to connect the U portion of each saddle to the adjacent ends of a pair of adjacent sections, and means to secure the saddles to the wheel.

2. Tire armor including a series of metal sections, each section having a central portion bent in the form of an inverted U to form a longitudinal anti-skidding part, the ends of said part extending beyond the ends of the section, a saddle shaped member at each end of each section, the saddle members having central projections which are received in the said U portion of the section, said saddle members being located beyond the ends of the section, means to connect the U portions of the saddles and sections, and means to secure the saddles to the wheel.

DANIEL FASOLD.

Witnesses:
  WILL RICKMAN,
  U. MCBRIDE.